Aug. 25, 1925.

G. SCHRADE ET AL 1,550,848

KNIFE HANDLE STAGGING MACHINE

Filed Aug. 11, 1923      3 Sheets-Sheet 1

Inventors
George Schrade and
Edward J. Conklin
By Chamberlain & Newman
Attorney

Aug. 25, 1925.
G. SCHRADE ET AL
1,550,848
KNIFE HANDLE STAGGING MACHINE
Filed Aug. 11, 1923    3 Sheets-Sheet 2
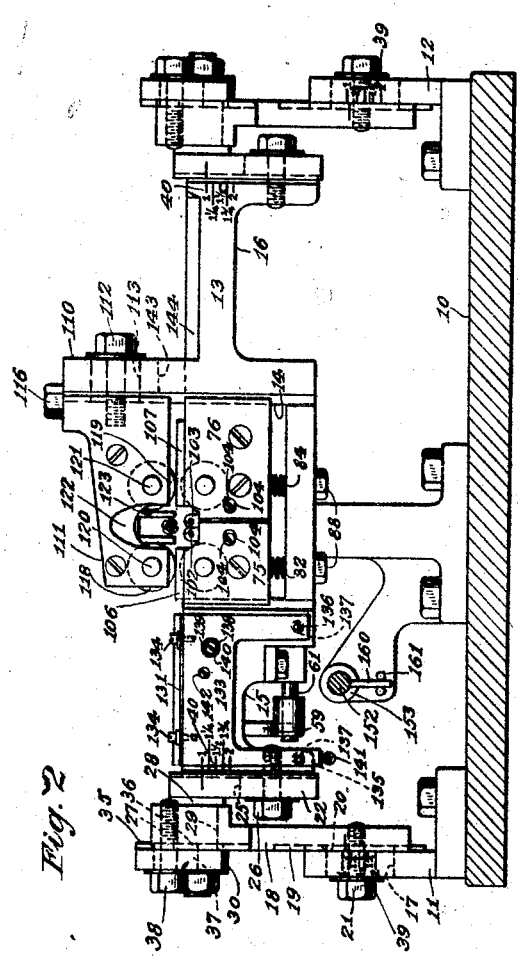
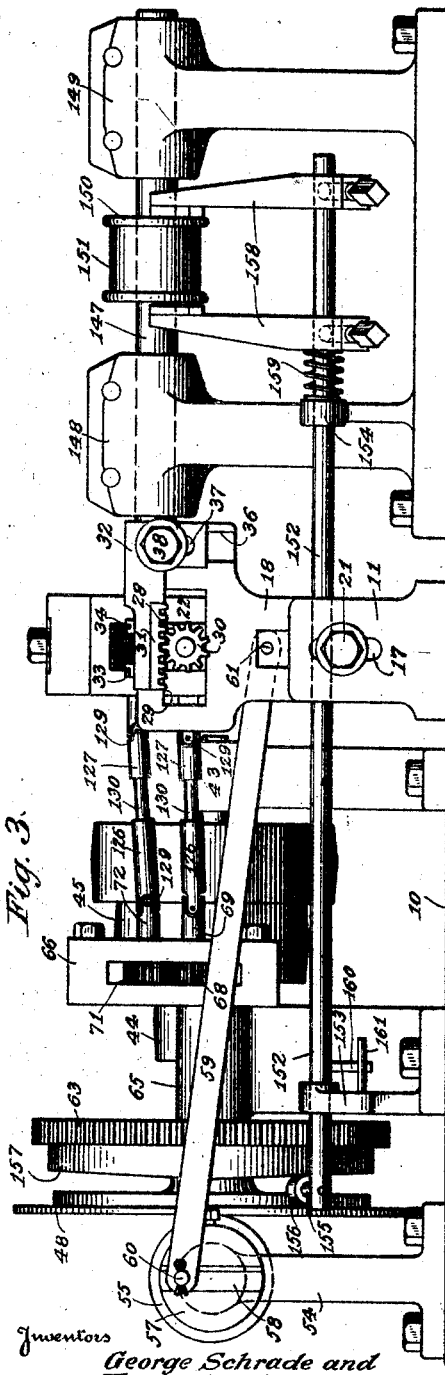
Inventors
George Schrade and
Edward J. Conklin.
By Chamberlain & Newman
Attorney

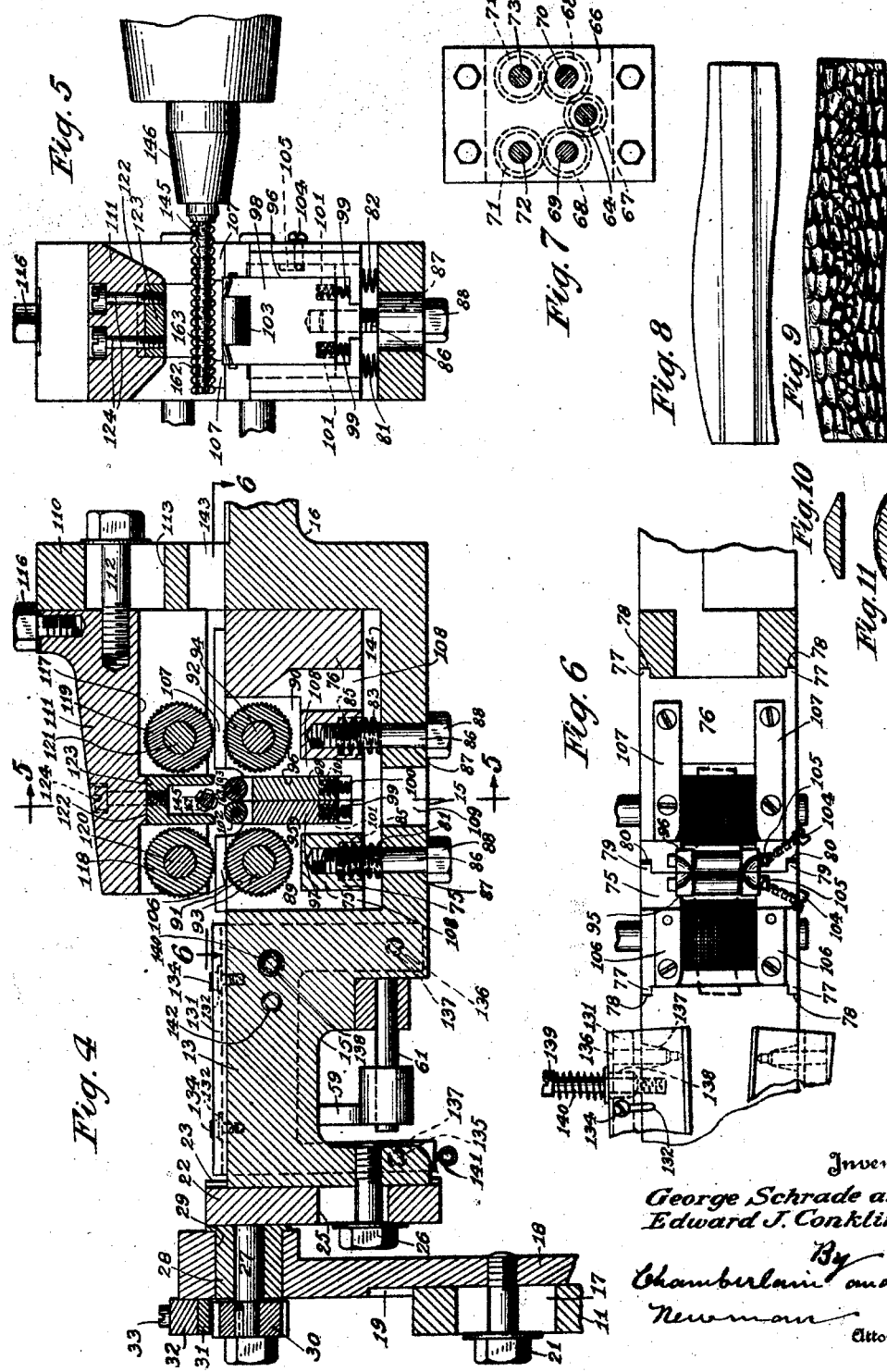

Patented Aug. 25, 1925.

1,550,848

UNITED STATES PATENT OFFICE.

GEORGE SCHRADE AND EDWARD J. CONKLIN, OF BRIDGEPORT, CONNECTICUT.

KNIFE-HANDLE-STAGGING MACHINE.

Application filed August 11, 1923. Serial No. 656,983.

*To all whom it may concern:*

Be it known that GEORGE SCHRADE and EDWARD J. CONKLIN, citizens of the United States, and residents of Bridgeport, in the county of Fairfield and State of Connecticut, have invented certain new and useful Improvements in Knife-Handle-Stagging Machines, of which the following is a specification.
The present invention relates to a knife-handle stagging machine, and has for its object to provide a machine by means of which bone strips, adapted for use as knife-handle covers and known in the trade as scales, may have their surfaces carved in imitation of stag horn. Heretofore this has been done by hand, the worker holding the bone strips in engagement with a cutting tool, and turning or manipulating the same, so that a stag horn like surface was cut. This required skilled operatives, the rate of production was low, and the work was not uniform and entailed a large percentage of rejections or spoiled pieces.
It is proposed in the present invention to provide a machine into which the bone strips may be fed, and from which they will emerge with their surfaces carved in imitation of stag horn. An object of the invention is to provide feed means adapted to produce a relative movement between the bone strips and the cutting tool, by which an irregular design will be cut, so that the finished handles will approximate in appearance genuine stag horn, and will be free of any suggestion of a stereotyped molded or machine made product. To this end it is proposed, in the present embodiment of the invention, to provide means by which a simultaneous forward feed and rocking movement will be imparted to the bone strips, and a longitudinally reciprocating movement imparted to the rotary cutting tool.
A further object is to provide adjustment means by which the radius of the rocking movement may be regulated, so that handles having different degrees of curvature may be produced.

A still further object is to provide adjustment means by which the depth of the cut may be regulated.

Other objects are rapidity of production, uniformity of product, a low percentage of rejections, and a machine which is of simple construction in operation, and will not readily get out of order.

With the above and other objects in view, an embodiment of the invention is shown in the accompanying drawings, and this embodiment will be hereinafter more fully described with reference thereto, and the invention will be finally pointed out in the claims.

In the drawings:

Fig. 2 is a transverse sectional view, taken along the line 2—2 of Fig. 1;

Fig. 3 is a front elevation of the machine;

Fig. 4 is an enlarged vertical sectional view, taken along the line 4—4 of Fig. 1;

Fig. 5 is a vertical sectional view, taken along the line 5—5 of Fig. 4, and showing the relation of the cutting tool to the work;

Fig. 6 is a horizontal sectional view, taken along the line 6—6 of Fig. 4;

Fig. 7 is a vertical sectional view, taken along the line 7—7 of Fig. 1, and showing the gear box employed;

Fig. 8 is a plan view of the bone strip, before being placed in the machine;

Fig. 9 is a plan view of the finished strip as it emerges from the machine;

Fig. 10 is a cross sectional view of Fig. 8; and

Fig. 11 is a cross sectional view of Fig. 9.

Figure 1:
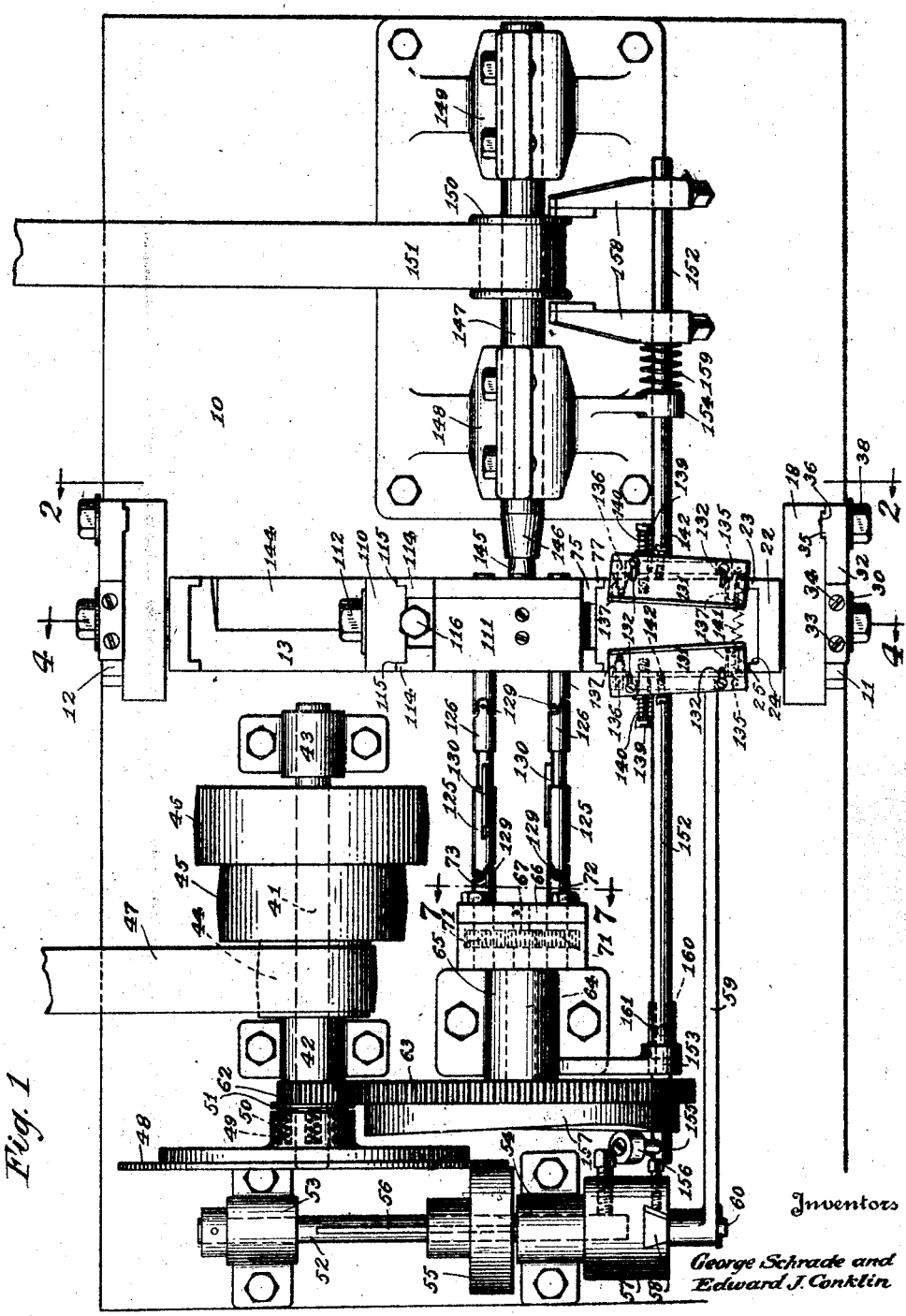
Fig. 1 is a plan view of a stagging machine, according to the present embodiment of the invention.

Similar reference characters indicate corresponding parts throughout the several figures of the drawings.

Referring to the drawings, the machine according to the present embodiment of the invention, comprises a bed plate 10, provided adjacent its front and rear edges with standards 11 and 12, upon which a rocking feed mechanism for the bone strips is supported, and which consists of a transversely disposed beam member 13, provided intermediately and in its upper side with a rectangular recess 14, and at each side thereof and in the lower side of the beam with recesses 15 and 16.

The standards 11 and 12 are each provided with a vertical slot 17 in which a vertically adjustable upright 18, having side flanges 19 engaged in side grooves 20 of the standard, is secured by a bolt 21. At each side of the beam there is provided a vertically adjustable upright 22, having side flanges 23 engaging side grooves 24 of the beam, and provided with a vertical slot 25 engaged by a bolt 26 to secure the upright in adjusted position. The upper end of the upright 22 is rockably hung from the upright 18, and to this end is provided with a projecting trunnion shaft 27 extending through and rotatable in a shouldered rectangular block 28, supported for longitudinal sliding movement in a rectangular slideway 29 provided in the upper end of the upright 18. Upon the end of the trunnion shaft there is removably secured a pinion 30 meshing with a rack 31, secured to an angular bracket 32 by screws 33 and 34, said bracket having a vertical rib 35 engaging a vertical groove 36 in the upright, and being provided with a vertical slot 37 engaged by a bolt 38 to secure the bracket in adjusted relation.

Rocking motion is imparted to the beam by means presently to be described more fully, the center line of the upper surface of the bone strip being worked on being upon a line passing through the circumferential center line through the teeth of the pinion at its point of intersection with the center line through the teeth of the rack, so that the arc of rocking movement of the strip is substantially about the axis of the pinion with the center line of the said strip as a fulcrum. During this rocking movement the axis of the pinion shifts longitudinally, and the arc of such rocking movement corresponds to the transverse curvature of the finished surface of the strip. In order to vary this curvature, the pinion is removable and different sized pinions may be substituted, the machine being illustrated with a one-inch pinion. Scale markings 39 and 40, inscribed with the sizes of the different gears used, are provided between the standards 11 and 12 and the uprights 18, and between the uprights 22 and the beam.

The substitute gears, say one and one-half inch diameter, are placed upon the trunnions by first adjusting the racks upwardly so that they mesh therewith. Thereupon the beam is adjusted upwardly to register the scale markings 40 at 1½ in., this bringing the upper surface to a point where the bone strips will align with the circumferential center line of the rack and pinion. The uprights 18 are then adjusted downwardly to register the scale markings 39 at 1½ in., this adjustment compensating for the upward adjustment of the beam, and reestablishing the proper relation of the cutting tool.

The driving mechanism for rocking the beam and feeding the bone strips consists of a pulley shaft 41 journaled in bearings 42 and 43 secured to the bed plate, and provided with stepped change speed pulleys 44, 45 and 46, over which a drive belt 47 extends. A friction disc 48 is keyed to the end of the pulley shaft, and is resiliently mounted for longitudinal yield by means of a plurality of expansion springs 49 disposed in sockets 50, and bearing upon a collar plate 51 secured to the shaft. A transverse shaft 52 is journaled in bearings 53 and 54 and carries a longitudinally adjustable friction wheel 55 keyed in an elongated slot 56 of the shaft, and bearing upon the surface of the friction disc. At the end of the shaft 52 there is secured a head 57, having a diametrically adjustable slide 58, to which one end of a connecting rod 59 is eccentrically connected by means of a pin 60, the other end being connected to a pin 61 provided in the recess 15 of the beam. Rocking movement is thus imparted to the beam.

The pulley shaft is furthermore provided with a pinion 62, which meshes with a large gear 63 mounted on a shaft 64, journaled in a bearing 65 and extending into a gear-box 66. Within the gear-box the shaft is provided with a pinion gear 67 which meshes with gears 68 provided on short shafts 69 and 70, and which gears 68 in turn mesh with gears 71 provided on short shafts 72 and 73, so that the two lower shafts rotate in clockwise direction, while the two upper shafts rotate in counterclockwise direction, and pairs of shafts being adapted to drive the feed rollers for the bone strips, as will be presently more fully described.

Within the recess 14 of the rocking beam there are provided a pair of vertically movable roller supports 75 and 76, respectively provided with side flanges 77 engaging guide grooves 78 of the beam, and the support 75 having side flanges 79 engaging guide grooves 80 in the support 76, so that the two supports may have vertical movement relatively to each other, and to the beam. The supports are respectively mounted upon pairs of springs 81, 82 and 83, 84 engaged in pockets 85, and are limited in their upward movement by adjustable bolts 86 secured in the under side of the supports, and extending through guide passages 87 in the beam, the heads 88 of the bolts bearing upon the under side of the beam.

The supports are provided at their upper sides with pockets 89 and 90, in which lower feed rollers 91 and 92 are respectively mounted on shafts 93 and 94. Between these rollers the supports are provided at their adjacent ends with recesses 95 and 96, in which a pair of plungers 97 and 98 are placed, resting at their lower ends upon pairs of springs 99 and 100, engaged in sockets 101, and provided at their respective upper ends with rollers 102 and 103 adapted to engage the bone strips directly beneath the cutting tool, to support the same and prevent their bending during the cutting operation. The plungers are limited in their upward movement by set screws 104 in the supports, engaged in grooves 105 in the sides of the plungers.

Guide strips 106 and 107 are provided at each side of the feed rollers to confine and guide the bone strips. A plurality of passages 108 are provided in the supports 75 and 76, and the beam is provided with an opening 109, for the purpose of carrying away the bone-dust produced by the cutting operation.

The beam is provided at one side of the recess 14 with an upright support 110, upon which is supported a vertically adjustable bracket 111 for the upper feed rollers, said bracket being secured by a bolt 112 engaged in a vertical slot 113 of the support, and being provided with side flanges 114 engaging guide grooves 115 in the support. An adjustment screw 116 in the bracket, having its head bearing upon the upper end of the support, is adapted to raise and lower the bracket, which adjustment together with the adjustment of the lower rollers by means of the bolts 86, is adapted to so position the feed rollers with realtion to the cutting tool that the depth of the cutting action may be regulated, as desired.

The under side of the bracket is channeled, as at 117, and is provided with upper feed rollers 118 and 119, directly above and in spaced relation to the lower feed rollers, and mounted on shafts 120 and 121. Between the upper rollers, the bracket is provided with a transverse space 122, and within this space an inverted U-shaped dust confining cap 123 is secured by means of screws 124.

The feed roller shafts 93, 94 and 120, 121, are driven from the shafts 69, 70 and 73, 74 by means of flexible telescoping shafts, each consisting of two sections 125 and 126, connected by universal joints 129 to the respective shaft ends, and having telescoping keyed connections 130 with each other. This construction permits of the continuous rotation of the rollers and feed of the bone-strips, while the beam is continuously rocked or vibrated.

At the forward end of the beam, the upper surface is flat, and constitutes a work receiving table to which the operator feeds the bone-strips to the rollers. Upon each side of this portion there is provided a resilient guide member, comprising an upper flanged guide strip 131, having a pair of transverse slots 132 therein, and secured for lateral adjustment upon the upper end of an inverted U-shaped side plate 133 by means of screws 134. Guide pins 135 and 136 are provided at the lower ends of the side plate which loosely engage in sockets 137 in the beam, and adjacent the inner end a hole 138 is provided, through which a smaller diameter bolt 139 is secured to the beam, a coil spring 140 being provided upon the bolt, which bears upon the outer side of the side plate to press the same inwardly, and at the same time permit of its outward yield. The lower ends of the outer legs of the two guide members are connected by a spring 141, so that the two members may yield outwardly and to any degree at each end, to accommodate strips of varying widths and of parallel, tapered or curved contour. A set screw 142 in the side plates of the guide members, bears upon the beam to limit and adjust the normal inwardly moved position of the inner ends of the members.

The upright 110 is provided with an ejection passage 143, through which the finished pieces emerge from the feed rollers, and are thereupon deflected by a beveled surface 144, provided upon the upper side of the beam, to a suitable receptacle.

The rotating cutting tool 145 is disposed between the feed rollers in position to engage the bone-strips as they are fed thereby, and is secured in a chuck 146 provided upon the end of a shaft 147 journaled in bearings 148 and 149 secured to the bed plate, and provided between the bearings with a pulley 150, over which a drive belt 151 extends. The cutting tool is adapted to be continously reciprocated, in timed relation to the feed and rocking movement of the bone strips, and to this end a reciprocating rod 152 is mounted in bearings 153 and 154, and is provided at one end with a right-angular stub shaft 155, carrying a roller 156, engaging a cam 157 provided on the gear 63, while at its other end it is provided with a yoke 158 embracing the pulley 150. A spring 159 is provided on the rod between the yoke and the bearing 154, and maintains the roller in engagement with the cam, while a pin 160, engaged between a fork 161 projecting from the bearing 148, prevents rotation of the rod.

The cutting tool is of a type adapted to cut pockets upon the bone-strip in imitation of stag horn, having a series of semi-circular circumferential teeth 162, and longitudinal grooves 163 having a straight or slightly receding cutting face and a beveled heel.

The operation of the machine is as follows:

The bone-strips, which prior to insertion in the machine, have their upper surfaces shaped as shown in Figs. 8 and 10, while their sides may be parallel, tapered or curved, depending upon the particular type of handle being produced, are fed between the rollers by being placed between the resilient guide strips 131, and are thereupon moved by the rollers into relation with the cutting tool. The beam is continuously rocked during the forward feed of the strips, with the result that a transversely curved upper surface is cut, the cutting tool forming a series of pockets. Due to the continuous feed of the strip and the simultaneous rocking of the beam, these pockets are arranged in staggered relation at each side of the center line while at the point of crossing at the center line a series of relatively smaller pockets, substantially half the size of the others, are cut. At the same time the continuous reciprocation of the cutting tool imparts a longitudinal undulation to the entire design, as shown clearly in Fig. 9, with the result that the finished handles have an irregular appearance, closely assimilating genuine stag horn.

The strips are fed to the machine continuously, as fast as the operator can place them between the feed rollers, one strip pushing the preceding strip through the ejection passage 143 to the beveled surface 144, where it is deflected into a suitable receptacle.

By using different sized pinions, as above pointed out, the arc of rocking movement of the strips may be changed, as desired, while the depth of the cut may be regulated by adjusting the feed rollers relatively to the cutting tool.

We have illustrated and described a preferred and satisfactory embodiment of the invention, but it will be obvious that changes may be made therein, within the spirit and scope thereof, as defined in the appended claims.

Having thus described our invention, what we claim and desire to secure by Letters Patent is:

1. In a machine of the character described, a rotary surface cutting tool, a strip supporting and guiding member, means adapted to impart rocking movement longitudinally of said cutting tool to said member, and feed rolls adapted to engage and feed a strip through the guide and into relation to said cutting tool during said rocking movement.

2. In a machine of the character described, a rotary surface cutting tool, a strip feeding and supporting member, means adapted to impart rocking movement to said member, upper and lower feed rollers carried by said member adapted to feed a strip of material in relation to said cutting tool during said rocking movement, drive means for said rollers including upper and lower shafts, meshing gears on said shafts, and flexible driving connections between said shafts and said rollers.

3. In a machine of the character described, a rotary surface cutting tool, a strip feeding and supporting member, means adapted to impart rocking movement to said member, upper and lower feed rollers carried by said member adapted to feed a strip in relation to said cutting tool during said rocking movement, drive means for said rollers, and flexible driving connection means between said drive means and said rollers.

4. In a machine of the character described, a rotary surface cutting tool, a strip feeding and supporting member, means adapted to impart rocking movement to said member, feed means carried by said member adapted to feed a strip in relation to said cutting tool during said rocking movement and in a direction at right angles to the axis of said cutting tool.

5. In a machine of the character described, a rockable feeding and supporting member, a reciprocatory and rotary surface cutting tool, upper and lower feed rollers carried by said member, means supporting one of said rollers in spaced relation to the other, and adjustable means adapted to maintain and permit variation of said spaced relation.

6. In machine of the character described, a rockable strip feeding and supporting member, a reciprocatory and rotary surface cutting tool, upper and lower feed rollers carried by said member, resilient means supporting one of said rollers in spaced relation to the other, and adjustable means adapted to maintain and permit variation of said spaced relation.

7. In a machine of the character described, a rockable strip feeding and supporting member, a rotary and reciprocatory surface cutting tool, upper and lower pairs of feed rollers mounted in said rockable member and disposed respectively at each side of said cutting tool and adapted to feed a strip in relation to said cutting tool, and supporting means for supporting said strip beneath the cutting tool and between said pairs of rollers during the cutting operation.

8. In a machine of the character described, a rotary surface cutting tool, a strip feeding and supporting member, upper and lower pairs of feed rollers disposed respectively at each side of said cutting tool, and adapted to feed a strip in relation to said cutting tool, and resilient supporting means for supporting said strip beneath the cutting tool and between said pairs of rollers during the cutting operation.

9. In a machine of the character described, a rotary surface cutting tool, a strip guideway, upper and lower pairs of feed rollers disposed respectively at each side of said cutting tool and adapted to feed a strip through the guideway and in relation to said cutting tool, independent resilient means for supporting said strip when passing beneath the cutting tool and relatively to each other and to said member.

10. In a machine of the character described, a rotary surface cutting tool, a strip feeding and supporting member, upper and lower pairs of feed rollers disposed respectively at each side of said cutting tool and adapted to feed a strip in relation to said cutting tool, and a pair of resilient supporting means for supporting said strip beneath the cutting tool and between said pairs of rollers during the cutting operation, said supporting means adapted to have independent vertical movement relatively to each other and to said member.

11. In a machine of the character described, a rotary surface cutting tool, means for supporting and feeding a strip under the cutting tool, feed means for imparting rocking movement longitudinally of said cutting tool to said supporting and feeding means, and means for guiding strips to said feeding means and adapted to maintain them in alignment during the rocking of the support and feeding of the strip.

12. In a machine of the character described, a rotary surface cutting tool, means for imparting thereto reciprocatory movement, a strip feeding and supporting member, feed rolls carried by said member adapted to feed a strip in relation to said cutting tool, and yieldable guide means adapted to snugly engage each edge of said strips to guide them to said feeding means and adapted to maintain them in alignment.

13. In a machine of the character described, a rotary surface cutting tool, a strip feeding and supporting member, means adapted to impart rocking movement to said member, feeding means adapted to feed a strip in relation to said cutting tool, guide means adapted to engage said strips at each side to guide them to said feeding means and adapted to maintain them in alignment, and means for imparting a reciprocatory movement to said cutting tool while the strip feeding member is operating.

14. In a machine of the character described, a rotary surface cutting tool, a strip feeding rocking beam, trunnions supporting said beam at its ends, gears on said trunnions, stationary racks meshing with said gears, feed means carried by said beam adapted to feed a strip in relation to said cutting tool, and means for rocking said beam, the center line through the teeth of said gears and racks being coincident with the center line of the strip being fed whereby said strip is rocked about said center line.

15. In a machine of the character described, a rotary surface cutting tool, a strip feeding rocking beam, trunnions supporting said beam at its ends, removable gears on said trunnions, vertically adjustable racks meshing with said gears, feed means carried by said beam adapted to feed a strip in relation to said cutting tool, and means for rocking said beam, the center line through the teeth of said gears and racks being coincident with the center line of the strip being fed whereby said strip is rocked about said center line, the arc of said rocking movement being dependent on the diameter of said gears.

16. In a machine of the character described, a rotary surface cutting tool, a strip feeding rocking beam, trunnions supporting said beam at its ends, said beam being vertically adjustable relatively to said trunnions, means supporting said trunnions for vertical adjustment, removable gears on said trunnions, vertically adjustable racks meshing with said gears, feed means carried by said beam adapted to feed a strip in relation to said cutting tool, and means for rocking said beam, the center line through the teeth of said gears and racks being coincident with the center line of the strip being fed whereby said strip is rocked about said center line, the arc of said rocking movement being dependent on the diameter of said gears.

17. The invention as in claim 25, further characterized by scale markings, indicating sizes of gears, between said beam and said trunnions, and between said trunnions and their supporting means.

18. In a machine of the character described, a rotary surface cutting tool, a strip feeding and supporting member, means adapted to impart rocking movement to said member, upper and lower feed rollers carried by said member adapted to feed a strip of material in relation to said cutting tool during said rocking movement, a drive shaft, a gear driven thereby, upper and lower gears driven in train by said gear, and flexible driving connections between said gears and said respective rollers.

19. In a machine of the character described, a rotary surface cutting tool, a strip feeding and supporting member, a continuously driven eccentric, a driving connection between said eccentric and said member whereby the latter is rocked, and feed means carried by said member adapted to feed a strip of material in relation to said cutting tool during said rocking movement.

20. In a machine of the character described, a rotary surface cutting tool, a strip feeding and supporting member, a drive shaft, an eccentric, a friction driving connection between said drive shaft and said eccentric, a driving connection between said eccentric and said member whereby the latter is rocked, and feed means carried by said member adapted to feed a strip of material in relation to said cutting tool during said rocking movement.

21. In a machine of the character described, a rotary cutting tool, a strip feeding and supporting member, means adapted to feed a strip of material in relation to said member and tool, means adapted to impart rocking movement to said member and a cam adapted to impart reciprocatory movement to said cutting tool during the cutting operation.

Signed at Bridgeport, in the county of Fairfield and State of Connecticut this 8th day of August A. D., 1923.

GEORGE SCHRADE.
    EDWARD J. CONKLIN.